Feb. 4, 1936. G. S. EDLIN ET AL 2,029,990
INTERNAL COMBUSTION ENGINE
Filed June 28, 1930  2 Sheets-Sheet 1
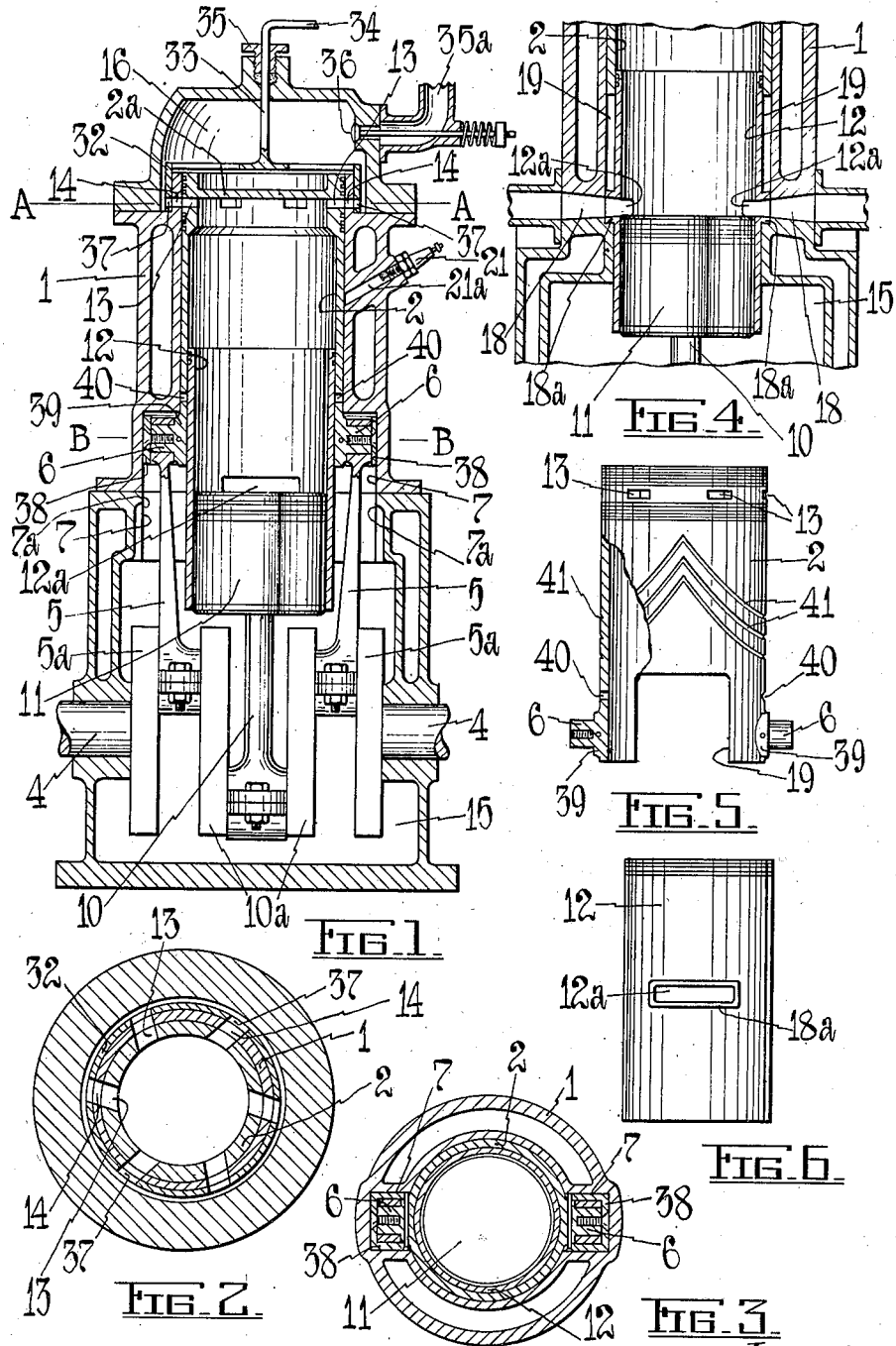
Inventors:-
George Stanley Edlin
Hector Halhead Stewart
by
Langner, Parry, Card & Langner
Attys.

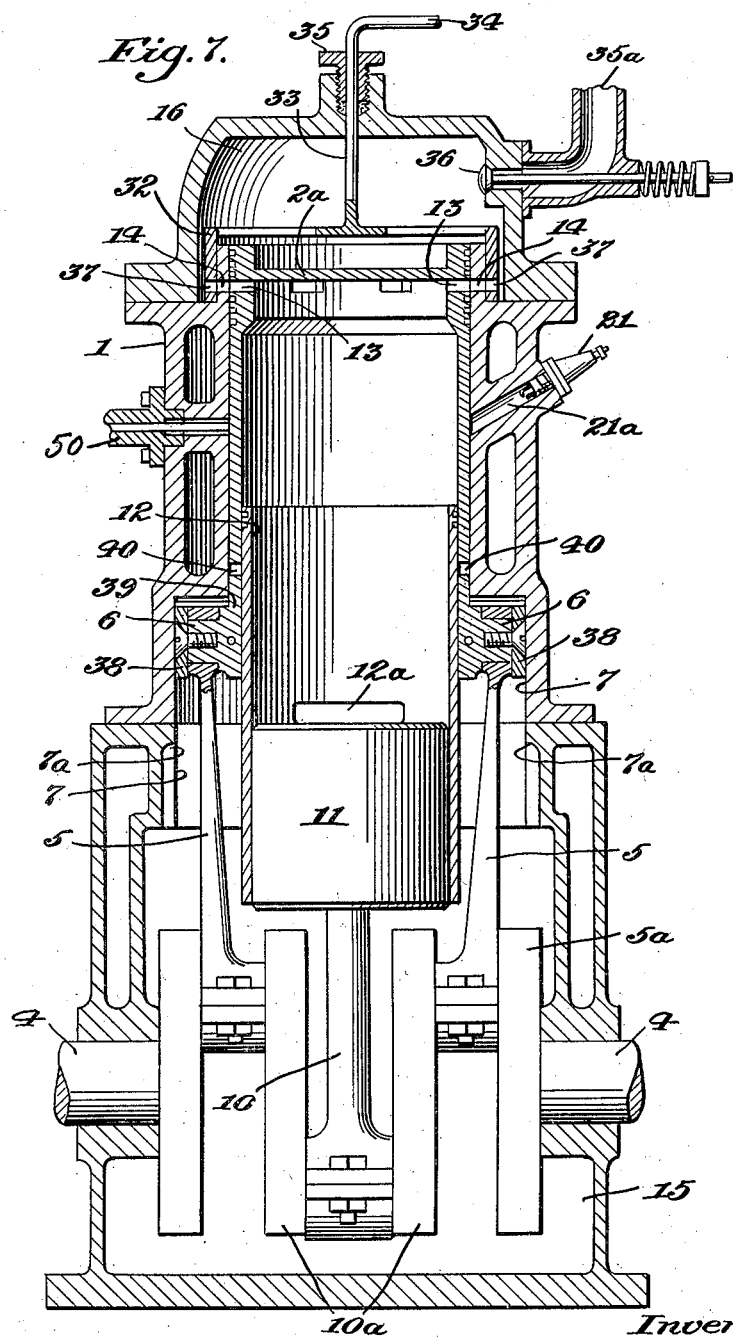

Patented Feb. 4, 1936

2,029,990

UNITED STATES PATENT OFFICE 2,029,990

INTERNAL COMBUSTION ENGINE

George Stanley Edlin and Hector Halhead Stewart, Auckland, New Zealand, assignors to The New Zealand Edlin-Stewart Engine Company Limited, Auckland, New Zealand, a company of New Zealand Application June 28, 1930, Serial No. 464,585

14 Claims. (Cl. 123—50)

This invention relates to internal combustion engines of the two stroke type wherein there are employed a piston and a closed top sleeve, reciprocated within a cylinder in opposite directions, the piston operating interiorly of the sleeve, and wherein each fuel charge receives an initial compression in a chamber open to the cylinder and is later transferred to between the head of the sleeve and the piston where it is finally compressed and ignited to produce a power impulse.

One of, if not the most serious of several obstacles to the successful operation of two stroke internal combustion engines of the constant volume type, is the dilution of the new or fresh charge of fuel mixture admitted to the combustion space, by the residue of burnt or spent gases of combustion left in said combustion space after the closing of the exhaust ports, which dilution is responsible for low efficiency of the engine, irregularity in performance, and loss of flexibility of the latter.

Objects of the present invention are, firstly, to prevent dilution of the new or fresh charge of fuel mixture in the combustion space of the engine, by the residue of burnt gases retained therein, and secondly to enable the engine to run without the use of a spark plug, by utilizing said residue to assist in bringing about ignition of the compressed fuel charge, in direct opposition to the accepted practice of endeavoring to rid the combustion space as completely as possible, of the products of combustion of the previously ignited charge.

According to the invention, dilution of the newly admitted or fresh charge of fuel mixture within the combustion space is prevented, by forming said charge into a comparatively dense body in said space, instead of following known practice which not only admits the charge in one or more streams, but permits further disintegration thereof in the combustion space, which disintegration facilitates the intermingling of the new or fresh charge with the residual or spent gases, and results in dilution of the former. By maintaining the newly admitted fuel charge in a comparatively dense body, not only is dilution of said charge prevented, but the residual or spent gases are kept apart from the new gas, and the latent heat therein is enabled to be utilized to perform useful work, or in other words to supplement the heat generated by compression in the combustion space, so that with comparatively low compression in the latter the temperature is enabled to be raised sufficiently to ignite the charge of fuel mixture.

As will be hereinafter described, ignition of the new charge of fuel mixture may be determined by regulating or controlling the turbulence of the newly admitted charge so as to cause the latter to more quickly or more slowly absorb the heat units of the residual gases as may be desired, and thereby advance or retard respectively, ignition of the new charge.

A further object of the invention, is to provide for simple and effective lubrication of the sliding sleeve by operating members attached thereto, to cause lubricant to be drawn from the crank case and passed to the outer and inner surfaces of the sliding sleeve.

A still further object of the invention is to make provision for the operation of the engine on crude oil.

In order that the improvements comprising the invention may be better understood they will be more particularly described with the aid of the accompanying drawings, wherein Fig. 1 is a sectional elevation of an engine fitted with the improvements, Fig. 2 a horizontal sectional view, on the line A—A, Fig. 1, Fig. 3 a horizontal sectional view on the line B—B, Fig. 1, Fig. 4 a part sectional elevation taken at right angles to the section shown in Fig. 1, Fig. 5 a part sectional view and part elevation of the sliding sleeve.

Fig. 6 an elevation view of the stationary sleeve.

Fig. 7 is a sectional elevation of an engine featured with an oil injector.

The engine cylinder 1 has working in right lines therein, the sleeve 2 closed at its end 2a remote from the crank shaft 4, and operated therefrom per medium of connecting rods 5 and cranks 5a, while a piston 11 connected by a rod 10 with a crank 10a on the crank shaft 4 and opposed to the cranks 5a, operates within a stationary sleeve 12 placed interiorly of the reciprocating sleeve 2, the latter and the piston 11 balancing the crank shaft 4 and always moving in opposite directions.

The cylinder 1 is open at its upper end and extends into a primary compression chamber 16, into which fuel mixture is admitted through a non-return valve 36, the extension of said cylinder having formed therein ports 14. An open topped ring 32 containing ports 37, surrounds the extension of said cylinder, and is operable thereon by a stem 33 which passes through a stuffing box 35, and is provided with an operating handle 34 located externally of the engine.

The reciprocating sleeve 2 contains near its head or end 2a ports 13 adapted to register with the ports 14 in the cylinder extension when said sleeve 2 is at the limit of its outward stroke.

The stationary sleeve 12 is fitted to extend down into the crank case 15 in order that the piston 11 and reciprocating sleeve 2 may be brought as near as practicable to the crank shaft 4 and so reduce the height of the engine.

Exhaust ports 12a in the stationary sleeve 12 communicate through bosses 18a formed on the outside of said sleeve, with exhaust ports 18 in the cylinder 1, the latter ports being open to atmosphere direct, or being connected with a common exhaust pipe, as may be desired.

To enable the reciprocating sleeve 2 to clear the bosses 18, said sleeve has portions removed at 19.

Briefly the operation of the engine is as follows:—Movement of the sleeve 2 towards the crank shaft 4 draws a charge of fuel mixture through the induction pipe 35a and past the valve 36 into the chamber 16, and upon the return or outward stroke of the sleeve 2, said charge of fuel mixture is compressed by the latter in the chamber 16, so that with the ring 32 set so that its ports 37 are open to the ports 14 in the cylinder extension, the fuel charge compressed in the chamber 16 will upon the ports 13 in the sleeve 2 registering with the ports 14, pass into the combustion space of the engine bounded at the top by the head 2a of the sleeve 2, and at the bottom by the piston 11.

The sleeve 2 and the piston 11 then travel towards each other, the ports 13 of the former being closed by the cylinder 1, while the exhaust ports 12a are closed by the piston 11, the charge just introduced into the combustion space being compressed, and at the critical moment ignited by a spark from a plug 21 inserted in the cylinder wall, and introduced into the combustion space through a port 13 which exposes the spark plug chamber 21a.

The sleeve 2 and piston 11 are then forced apart by the power impulse produced, the former to compress in the chamber 16 a further charge of fuel mixture drawn into the latter during its inward stroke, and to finally pass the compressed charge to the combustion space, while the piston 11 uncovers the exhaust ports 12a and permits portion of the spent gases of combustion to escape to atmosphere.

Once having set the engine in operation, the spark plug 21 can be put out of commission, the firing of the compressed charge in the combustion space being performed as will now be described.

The piston 11 upon commencing its outward stroke closes the exhaust ports 12a and traps in the combustion space a residue or a proportion of the spent gases of combustion, and this residue of hitherto objectionable and waste gases is utilized in firing the charges of fuel mixture introduced into the combustion space. As however uncontrolled intermingling of the trapped residual or spent gases with the new or freshly introduced fuel charges, would result in uncontrollable ignition of the latter and thereby defeat the end aimed at, it is necessary to prevent such intermingling until such time as firing of the charge is desired, or in other words, to control or maintain the charges of fuel mixture and the trapped residual or spent gases, in separate bodies until the critical moment of compression and the sleeve 2 and piston 11 are in the most favourable positions to receive power impulses.

It has been found that a sufficiently dense body of fuel mixture in the upper portion of the combustion space will not intermingle with the body of trapped residual or spent gases in the lower portion thereof, and that if the two bodies are pressed together, the heat units contained in the residual or spent gases will ultimately be absorbed by the body of fuel mixture, which absorbed heat will combine with the heat generated under compression and the heat already contained in the body of fuel mixture, to ignite the latter and produce a power impulse. Therefore, if the temperature of the body of fuel mixture, after being further raised by absorption of the heat units of the residual or spent gases, be sufficient at the moment of compression a power impulse is desired, and provided also the compression is high enough for the purpose, the body of fuel mixture will ignite and produce such impulse.

Compactness or density of the body of fuel mixture within the combustion space of the engine is obtained by introducing the fuel charge into said space in such a manner that it is given a swirling motion therein, the latter being produced by forming the ports 13 (Fig. 2) in the reciprocating sleeve 2, so that their vertical edges do not pass radially through the sleeve, but are inclined to produce incoming jets of fuel mixture which pass to one side of the vertical axis of the sleeve and strike each other to combine and produce a swirling mass or body, which is immediately trapped and retained in a swirling and dense condition in the top of the sleeve 2, by downward movement of the latter, to be ultimately pressed, while still swirling and before dissipation can take place, into such intimate contact with the upwardly pressed body of residual gases as will result in ignition of the fuel mixture. The ports 14 in the extension of the cylinder 1, and the ports 37 in the ring 32, can be formed in a similar manner to the ports 13.

By restricting the area of the ports 14 by means of the ported ring 32, and increasing the velocity of the jets of fuel mixture, increased turbulence of the swirling mass or body of fuel mixture is obtained, with the result that ignition is retarded, while on the other hand, decreased velocity of the jets of fuel mixture and loss of turbulence results in an advance in the time of ignition.

Lubrication of the reciprocating sleeve 2 is provided for by utilizing the upper ends of the connecting rods 5 and slippers 38 fitted over the trunnions 6 of the reciprocating sleeve 2, to serve as pump plungers. These slippers 38 are secured to bosses 39 on the sleeve 2, and enclose the upper ends of the rods 5, and operate in vertical guide slots 7 in the walls of the cylinder 1, for the purpose of relieving the sleeve 2 of lateral thrust.

The guide slots 7 are open at their inner ends to the crank case 15, and with the slippers 38 a neat fit in the guide slots 7, a partial vacuum is created in the outer portions of said guide slots upon the inward stroke of the slippers 38, with the result that immediately the latter clear the portions 7a of the guide slots 7, oil mist or vapour created by the rotation of the cranks 5a and 10a in the oil in the crank case 15, passes into said guide slots.

Upon the following outward stroke of the slippers 38 in the guide slots 7, the oil mist or vapour in the outer portions of the guide slots 7 is trapped and compressed therein and lubricates the outer surface of the sleeve 2, and is also forced through one or a series of holes 40 in said sleeve 2 to between the latter and the stationary sleeve 12.

In order to distribute the lubricant between the contacting surfaces of the reciprocating sleeve 2 and the cylinder 1, the former has cut in its outer surface, shallow grooves 41 (Fig. 5) the latter passing from each side of the guide slots 7, and converging towards the head 2a of said sleeve. The bosses 18a on the stationary sleeve 12 prevent lubricant from finding its way to the exhaust ports 18, and also serve as distance pieces between the cylinder 1 and said sleeve, at the same time enabling the latter to resist lateral thrust of the piston 11.

When it is desired to run the engine on crude oil, air alone is drawn into and compressed in the chamber 16 and later transferred to the combustion space, when at the critical moment of compression of the air and residual gases, a charge of highly atomized crude oil fuel is injected through the injector 50 into the combustion space as shown in Figure 7.

What we do claim and desire to obtain by Letters Patent of the United States of America is:—

1. A method of operating internal combustion engines, comprising injecting a plurality of jets of fuel mixture into the combustion space thereof to produce a dense body in said space, simultaneously with the trapping of a body of gases of combustion in said space for the purpose of raising the temperature of said fuel mixture, compressing said bodies together as separate but contacting bodies, and generating by compression the balance of heat necessary to bring about ignition of the fuel mixture.

2. A method of operating internal combustion engines comprising injecting into the combustion space thereof a plurality of jets of fuel mixture directed to produce in said space a swirling body of said mixture, simultaneously with the trapping of a body of gases of combustion in said space, for the purpose of raising the temperature of said fuel mixture, compressing said bodies together as separate but contacting bodies, and generating by compression the balance of heat necessary to bring about ignition of the fuel mixture.

3. In an internal combustion engine having a reciprocating sleeve operating between a cylinder wall and a stationary sleeve and a piston operating in the latter, means for lubricating said cylinder and sleeves, comprising guide slots in the cylinder walls, open to the engine crank case, and slippers operating in said guides to draw lubricant from the crank case and pass same to the cylinder and sleeve surfaces.

4. In an internal combustion engine having a reciprocating sleeve operating between a cylinder wall and a stationary sleeve and a piston operating in the latter, means for lubricating said cylinder and sleeves, as in claim 3, wherein the reciprocating sleeve contains grooves in its outer surface, and also contains holes for the passage of lubricant to the stationary sleeve.

5. In an internal combustion engine having a reciprocating sleeve operating between a cylinder wall and a stationary sleeve and a piston operating in the latter, means for lubricating said cylinder and sleeves as in claim 3, wherein the slippers are fitted over trunnions on the reciprocating sleeve and also over the ends of the connecting rods thereto.

6. In an internal combustion engine, a cylinder wall containing exhaust ports, a stationary sleeve containing exhaust ports formed through bosses thereon, the latter extending to the cylinder wall so that the stationary sleeve ports register with the cylinder ports, and a reciprocating sleeve with opposite portions removed therefrom, operating between said cylinder wall and said stationary sleeve.

7. In an internal combustion engine, means for producing a dense body of fuel mixture in the combustion space thereof, comprising a wall bounding said space having inclined ports opening into the latter whereby a dense body of fuel mixture or air is created due to the swirling motion imparted by said ports and means for varying the inclination of said ports.

8. In an internal combustion engine, means for producing a dense body of fuel mixture in the combustion space thereof, comprising a wall bounding said space having inclined ports opening into the latter and directed so that jets of fuel mixture passing therethrough strike each other and combine to form a swirling mass whereby a dense body of fuel mixture or air is created, and means for varying the inclination of said ports.

9. A method of operating internal combustion engines comprising trapping a body of combustion gases in the lower end of the cylinder space, forming a separate dense body of fuel mixture in said cylinder space, then compressing said bodies together to bring about ignition of the fuel mixture and adjusting the time of ignition by varying the areas of the admission ports of the cylinder to vary the speed of rotation of the fuel mixture in said cylinder space.

10. A method of operating internal combustion engines comprising trapping a body of gases of combustion in the lower end of the cylinder space, forming a separate dense body of fuel mixture in said cylinder space, compressing said bodies together to bring about ignition of the fuel mixture and varying the time of ignition by varying the turbulence of the body of the fuel mixture.

11. A method of operating internal combustion engines comprising trapping a body of gases of combustion in the lower end of the cylinder space, forming a separate dense body of fuel mixture in said cylinder space, compressing said bodies together to bring about ignition of the fuel mixture and varying the time of ignition by varying the volume and the turbulence of the body of fuel mixture.

12. A method of operating internal combustion engines comprising trapping a body of gases of combustion in the lower end of the cylinder space, forming a separate dense body of fuel mixture in said cylinder space, compressing said bodies together to bring about ignition of the fuel mixture, and the density of the body of fuel mixture being varied by varying the volume and the intensity of the jets of fuel mixture which combine to form said body.

13. In an internal combustion engine, means for producing a dense body of fuel mixture in the combustion space thereof comprising a wall bounding said space, a reciprocating sleeve having inclined ports opening into said combustion space whereby a dense body of fuel mixture or air is created due to the swirling motion imparted by said ports and means for maintaining in said combustion space a portion of the gases of combustion to assist in raising said dense body of fuel mixture to the temperature required for ignition.

14. In an internal combustion engine, means for producing a dense body of fuel mixture in the combustion space thereof comprising a wall bounding said space, a cylinder extension, a ring operable on said extension, a reciprocating sleeve operating in said cylinder extension, said reciprocating sleeve having inclined ports opening into the combustion space whereby a dense body of fuel mixture or air is created due to the swirling motion imparted by said ports and means for maintaining in said combustion space a portion of the gases of combustion to assist in raising said dense body of fuel mixture to the temperature required for ignition.

GEORGE STANLEY EDLIN.
HECTOR HALHEAD STEWART.